(12) United States Patent
Okumura

(10) Patent No.: US 9,159,078 B2
(45) Date of Patent: Oct. 13, 2015

(54) MANAGING IDENTIFIERS

(71) Applicant: True Ultimate Standards Everywhere, Inc., San Francisco, CA (US)

(72) Inventor: Kenneth K. Okumura, Sunnyvale, CA (US)

(73) Assignee: True Ultimate Standards Everywhere, Inc., San Francisco, CA (US)

( * ) Notice: Subject to any disclaimer, the term of this patent is extended or adjusted under 35 U.S.C. 154(b) by 100 days.

(21) Appl. No.: 13/839,192

(22) Filed: Mar. 15, 2013

(65) Prior Publication Data

US 2014/0279989 A1 Sep. 18, 2014

(51) Int. Cl.
*G06F 17/30* (2006.01)
*G06Q 30/02* (2012.01)

(52) U.S. Cl.
CPC ........ *G06Q 30/0204* (2013.01); *G06Q 30/0201* (2013.01)

(58) Field of Classification Search
USPC ................................................ 707/609, 705
See application file for complete search history.

(56) References Cited

U.S. PATENT DOCUMENTS

| | | | |
|---|---|---|---|
| 6,275,941 B1 | 8/2001 | Saito et al. | |
| 6,775,772 B1 | 8/2004 | Binding et al. | |
| 7,013,389 B1 | 3/2006 | Srivastava et al. | |
| 7,299,288 B2 * | 11/2007 | Chang et al. | 709/229 |
| 7,376,827 B1 | 5/2008 | Jiao | |
| 7,467,402 B2 * | 12/2008 | Pennington et al. | 726/5 |
| 7,661,128 B2 * | 2/2010 | Chen et al. | 726/5 |
| 7,685,025 B2 * | 3/2010 | Islam | 705/26.1 |
| 7,783,884 B2 | 8/2010 | Nakano et al. | |
| 7,796,751 B2 | 9/2010 | Gentry | |
| 7,813,299 B2 | 10/2010 | Yumoto et al. | |
| 7,953,654 B2 * | 5/2011 | Abifaker | 705/35 |
| 8,024,781 B2 * | 9/2011 | Saunders et al. | 726/5 |
| 8,190,675 B2 * | 5/2012 | Tribbett | 709/203 |
| 8,281,389 B2 | 10/2012 | Beaver et al. | |
| 8,341,711 B1 * | 12/2012 | Pennington et al. | 726/7 |
| 8,341,715 B2 | 12/2012 | Sherkin et al. | |
| 8,392,255 B2 * | 3/2013 | Pradeep et al. | 705/14.42 |
| 8,396,744 B2 * | 3/2013 | Pradeep et al. | 705/14.41 |
| 8,688,583 B2 | 4/2014 | Boccon-Gibod et al. | |
| 2002/0029337 A1 | 3/2002 | Sudia et al. | |
| 2002/0073311 A1 | 6/2002 | Futamura et al. | |
| 2004/0015689 A1 | 1/2004 | Billhartz | |
| 2005/0005097 A1 | 1/2005 | Murakawa | |
| 2008/0201575 A1 | 8/2008 | van der Rijn | |
| 2011/0239270 A1 | 9/2011 | Sovio et al. | |
| 2012/0221955 A1 | 8/2012 | Raleigh et al. | |

(Continued)

OTHER PUBLICATIONS

Computer Desktop Encyclopedia definition of "processor", found on the world wide web at: http://lookup.computerlanguage.com/host_app/search?cid=C999999&term=processor&lookup.x=0&lookup.y=0.

(Continued)

*Primary Examiner* — Kim Nguyen
(74) *Attorney, Agent, or Firm* — Paul S. Drake

(57) ABSTRACT

A method, system or computer usable program product for managing attributes including utilizing a processor to generate a unique mutable identifier in response to a request from an end entity; obtaining a selected set of attributes from the end entity; associating and storing in memory the set of attributes with the unique mutable identifier; and providing the set of attributes associated with the mutable identifier to any application in response to an inquiry utilizing the unique mutable identifier from that application.

25 Claims, 8 Drawing Sheets

(56) References Cited

U.S. PATENT DOCUMENTS

2013/0124435 A1* 5/2013 Estes ............................ 706/11
2014/0013110 A1 1/2014 Thoniel et al.

OTHER PUBLICATIONS

Garcia, Diego Zuquim Guimaraes; de Toledo, Maria Beatriz Felgar; "A Web Service Architecture Providing QoS Management", LA-Web '06, Pub. Date: 2006, pp. 189-198, http://ieeexplore.ieee.org/stamp/stamp.jsp? tp=&rnumber=4022109.

Hamada, Takeo, "Dynamic Role Creation from Roll Class Hierarchy—Security Management of Service Session in Dynamic Service Environment", TINA 97, Pub. Date: 1997, pp. 152-163, http://ieeexplore.ieee.org/stamp/stamp.jsp?tp=&arnumber=660720.

"X.509", Wikipedia.com, Jan 9, 2012, found on the world wide web at: http://web.archive.org/web/20120109190205/http://en.wikipedia.org/wiki/X.509.

"XML", Wikipedia.com, Mar. 5, 2012, found on the world wide web at: http://web.archive.org/web120120305170157/https://en.wikipedia.org/wiki/Xml.

"Cython", Wikipedia.com, Dec 10, 2011, found on the world wide web at: http://web.archive.org/web/20111210144342/http://en.wikipedia.org/wiki/Cython.

* cited by examiner

510 Identifier
- ID = _____ /512

520 {

530 Identifier Attributes
- 532 – Date Created: _____
- 534 – Expiration Date: _____
- 536 – Record Size: _____
  - •
  - •

540 Linkages
- 542 – Prior Expired ID: _____
- 544 – Related ID: _____
  - •
  - •

550 General Attributes
- 552 – Location Tracking? ___ Override? ___
- 554 – Direct Advertising? ___ Override? ___
  - •
  - •

560 Application Specific Attributes
- Application(s): _____ – 562
- Creation Date: _____ – 564
- Last Updated: _____ – 566
- Preferences: _____ – 568
  - •
  - •

561

- •
  - •

}

MANAGING IDENTIFIERS

This application is copending with concurrently filed application Ser. No. 13/839,614 of Kenneth K. Okumura, filed on Mar. 15, 2013, entitled "MANAGING IDENTIFIERS", the disclosure of which is incorporated in its entirety herein by reference.

BACKGROUND

1. Technical Field

The present invention relates generally to managing identifiers, and in particular, to a computer implemented method for allowing the creation of a unique mutable identifier by a service provider and managing the attributes associated with that identifier.

2. Description of Related Art

Identity management includes managing identifiers of individuals. This includes the authentication, authorization and privileges of these identifiers across system, infrastructure, and/or enterprise domains. This is performed with the intent of providing security and increasing productivity.

Device identification includes assigning a unique identification to a device. This is also performed with the intent of providing security and increasing productivity, but for a device instead of an individual. One of the issues with using device identifiers is that they are immutable and many times they are associated with an individual. As a result, the device identifiers end up being an extension of an identity thus combining the two different domains.

Mobile devices such as smart phones, pad and pen-based computers are often linked to an individual with personally identifiable information (PII). PII may be obtained by a service or product provider of those devices during a registration and/or subscription process. The PII may be required for the purpose of providing service to the individual using the device.

Device identifiers are often used for purposes other than their original intention. One use of the device identifier is in digital advertising. The mobile advertising industry has relied heavily on device identifiers as a means to identify an individual on a device and across applications for the sole purpose of providing targeted advertising and measuring the effectiveness of that advertising. Because only certain information (behaviorally based) can be attributed to an individual, many times a mobile advertiser will attempt to bind identifying information obtained on a device with other offline information in order to form a complete profile of that individual. They don't have direct access to PII provided upon registration of the device itself, so they do it by other means and bind that information to the device identifier.

Such an approach has inherent disadvantages to an individual but is very advantageous to the advertisers. First of all, for those individuals who feel strongly about their privacy, there is no means for them to control use of their personal information. This has led to some device providers removing access to the device identifier from the device operating system. Advertisers may use alternative end-user identifiers on other operating systems or platforms, but this also raises concerns of privacy advocates.

With the myriad of mobile applications and the security and privacy related issues associated with those applications, there has been a focus on the various schemes that are used by these applications to associate device identifiers with an end user. There are many different techniques that mobile application developers use to identify end users of a mobile device. Most solutions today use a unique characteristic of the device itself. Whether it's UDID (unique device identifier), MAC (media access control) address, IMEI (international mobile equipment identity), device fingerprint or some other method, these particular modes of identification are also easy to track across applications and time and may be correlated back to the device and the user.

SUMMARY

The illustrative embodiments provide a method, system, and computer usable program product for managing attributes including utilizing a processor to generate a unique mutable identifier in response to a request from an end entity; obtaining a selected set of attributes from the end entity; associating and storing in memory the set of attributes with the unique mutable identifier; and providing the set of attributes associated with the mutable identifier to any application in response to an inquiry utilizing the unique mutable identifier from that application.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 5 is a block diagram of an identifier and its related attributes in which various embodiments may be implemented;

DETAILED DESCRIPTION

Processes and devices may be implemented and utilized to manage unique identifiers. A service provider provides, maintains, and otherwise manages a copy of each identifier. Each identifier is associated with a set of attributes including preferences such as privacy preferences. These attributes are selected by an end entity and may or may not be associated with a specific device or individual. These processes and apparatuses may be implemented and utilized as will be explained with reference to the various embodiments below.

Figure 1:
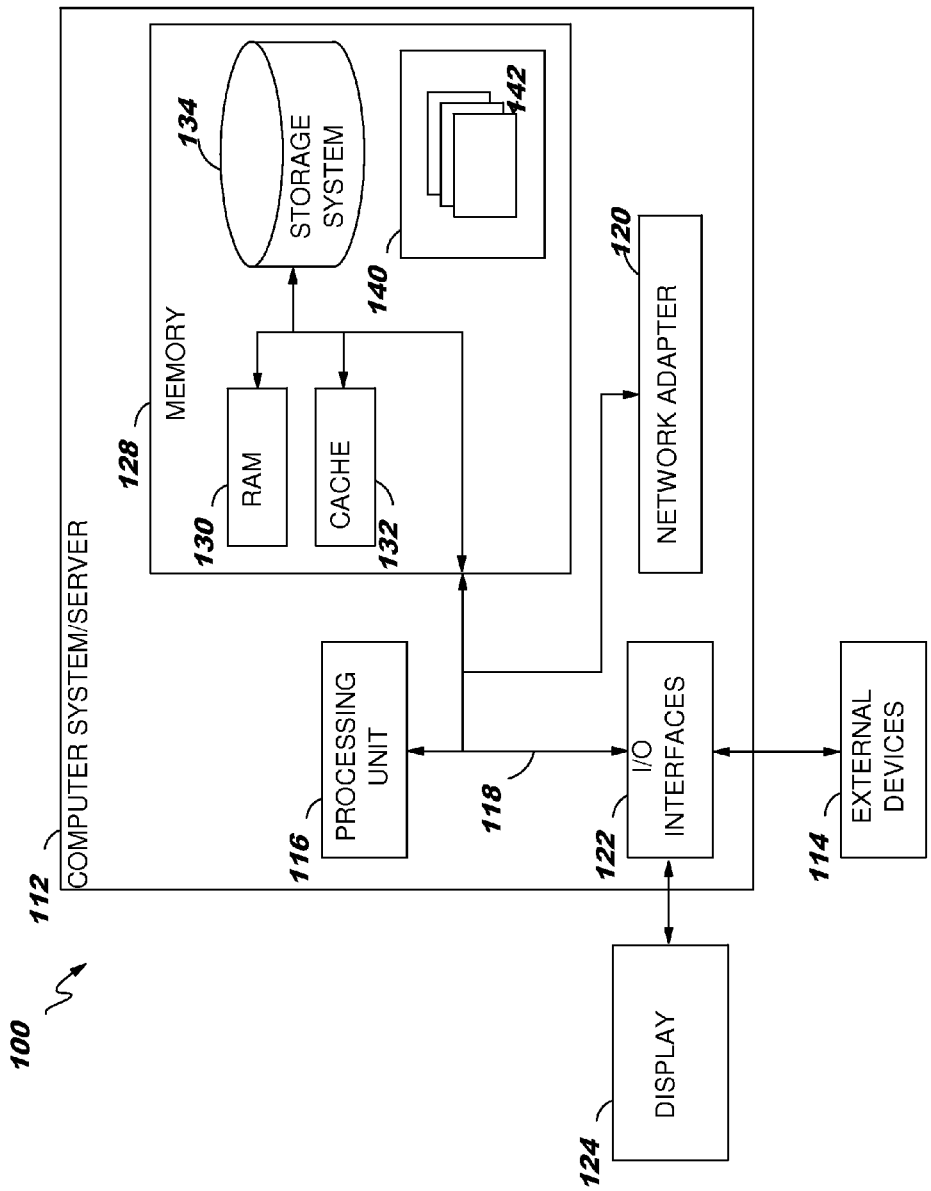
FIG. 1 is a block diagram of a data processing system in which various embodiments may be implemented.

FIG. 1 is a block diagram of a data processing system in which various embodiments may be implemented. Data processing system 100 is one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for generating and/or utilizing identifiers used in identifying and implementing an end user's preferences or other identifier attributes.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
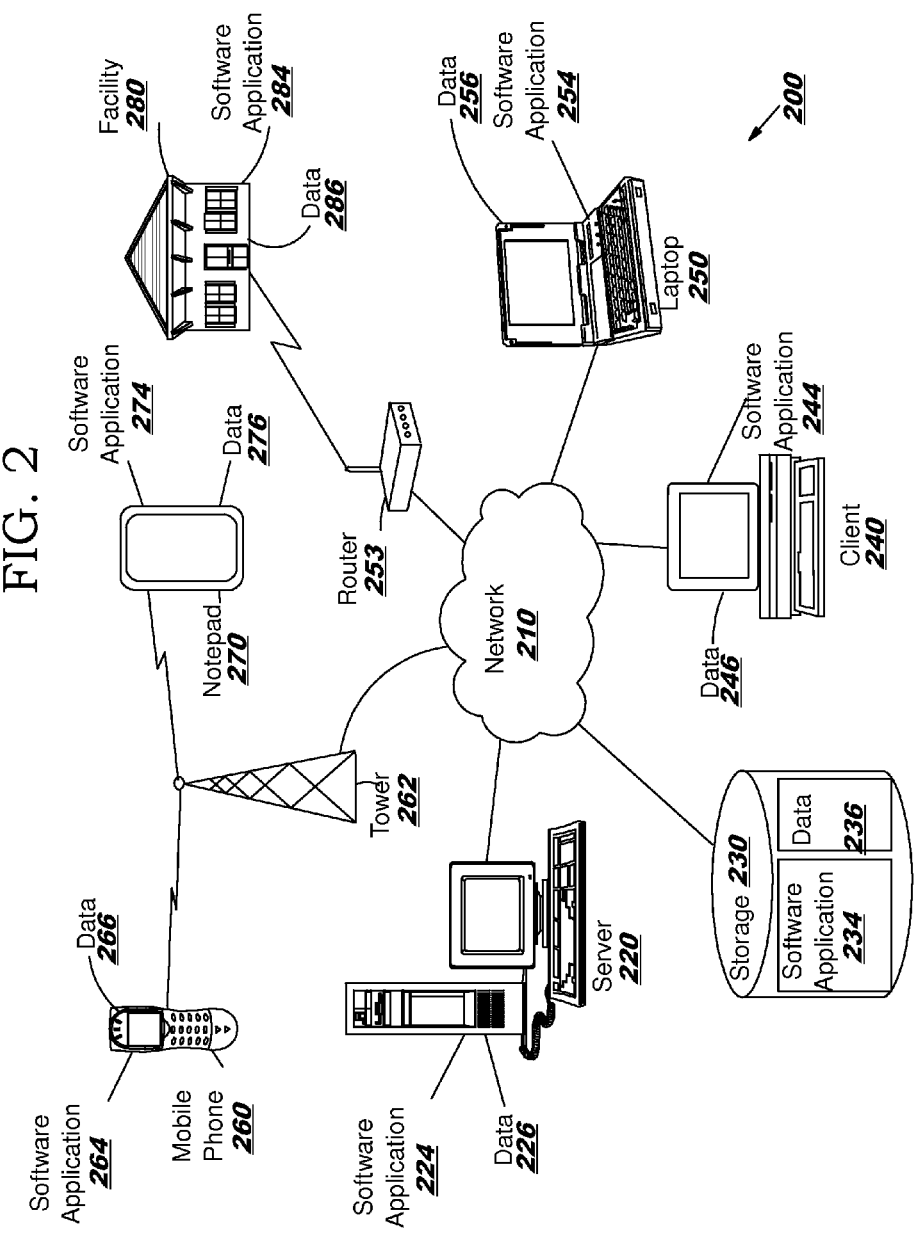
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1 and other types of end entities. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 and notepad 270 may be coupled to network 210 through a mobile phone tower 262 or through a wireless router 253 such as with a Wi-Fi connection. Data processing systems, such as server 220, client 240, laptop 250, mobile phone 260, notepad 270 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for generating and/or utilizing identifiers used in identifying and implementing an end user's preferences or other identifier attributes, or other software applications and data in accordance with embodiments described herein. Storage 230 may contain software application 234 and a content source such as data 236 for generating and/or utilizing identifiers used in identifying and implementing an end user's preferences or other identifier attributes. Other software and content may be stored on storage 230 for sharing among various computer or other data processing devices. Client 240 may include software application 244 and data 246. Laptop 250, mobile phone 260 and notepad 270 may also include software applications 254, 264 and 274 as well as data 256, 266 and 276. Facility 280 may include software applications 284 and data 286. Other types of data processing systems coupled to network 210 may also include software applications. Software applications could include a web browser, email, or other software application that can generate and/or utilize identifiers used in identifying and implementing an end user's preferences or other identifier attributes.

Server 220, storage unit 230, client 240, laptop 250, mobile phone 260, notepad 270, facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260, notepad 270 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
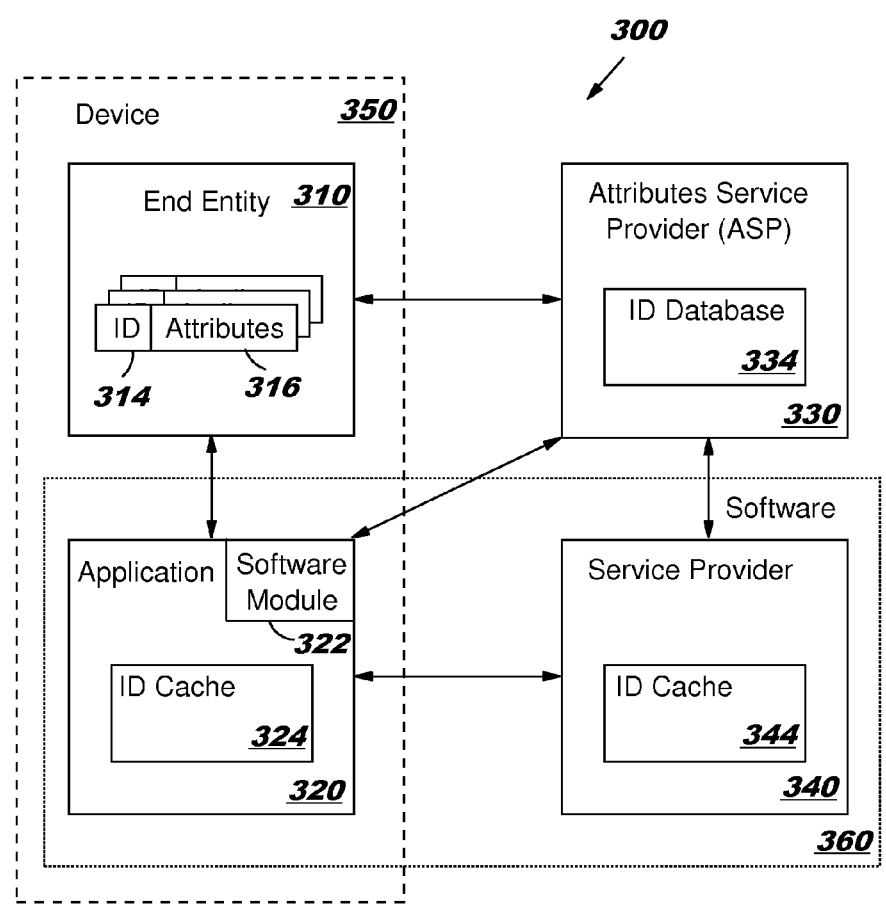
FIG. 3 is a block diagram of a system utilizing a unique identifier in which various embodiments may be implemented.

FIG. 3 is a block diagram of a system 300 utilizing a unique identifier in which various embodiments may be implemented. System 300 includes an end entity 310, an application 320, an attributes service provider 330, and a service provider 340.

End entity 310 may be a data processing system such as a device (e.g. mobile phone, notepad, desktop computer, etc.) running software such as an operating system and applications. These applications may include a spreadsheet, a document handler, a picture, an internet browser, etc.

End entity 310 includes at least one identifier 314 that is unique and mutable. Multiple identifiers may be utilized for a variety of reasons, such as when multiple users may utilize the same device, or when a user wishes to utilize different sets of corresponding attributes at different times or purposes. End entity 310 may optionally include at least one set of preferred attributes 316, each set of attributes corresponding to one identifier.

Application 320 is a set of software performing tasks or other services for the end entity. Application 320 and end entity 310 may reside on the same device 350 or different devices. If on different devices, application 320 may communicate with multiple end entities, each end entity having different identifiers and attributes. Application 320 can be an application downloaded onto a data processing system such as mobile phone or other mobile device end entity, a web page located on a remote server accessed across the internet by a user such as through a notepad end entity, virtual machine software performing tasks such as for a desktop end entity, or other software application performing tasks for an end entity, either internally or across a network. Application 320 may work with other applications running on end entity 310.

Application 320 can include a software module 322 for handling end entity identifiers and their related attributes. Software module 322 may be added to an application by using a software development kit (SDK) specific for that purpose. Such an SDK would allow for consistent and standard handling of end entity identifiers and their associated attributes by any application implementing that SDK. Application 320 can optionally maintain an ID cache (database) 324, particularly if application 320 resides on a separate device from end entity 310. This ID cache includes one or more IDs of the end entity and optionally the sets of attributes corresponding to those IDs.

Attribute service provider (ASP) 330 is a service provider that manages identifiers and their associated attributes on behalf of end entities. This includes generating unique mutable identifiers upon request, storing those identifiers with end entity preferences and other attributes, managing the distribution of the identifier attributes with applications and service providers, and policing the proper utilization of the identifiers and their attributes. ASP 330 includes an ID database 334 including a copy of the end entity identifiers as well as related attributes for those identifiers.

Service provider 340 utilizes information provided by application 320 for providing tasks or other services supplementing or supporting services provided by application 320 for end entity 310. Service provider 340 may be a mapping service, advertiser, clearing house, or other provider of services. Service provider 340 may be the same set of software 360 as application 320. Service provider 340 can optionally maintain an ID cache (database) 344 including identifiers and possibly their corresponding attributes.

End entity 310 contains at least one identifier (ID) 314 and optionally may include attributes 316, which may be created in communication with ASP 330 as described below with reference to FIG. 4. Multiple identifiers may be utilized by a single end entity for a variety of reasons, such as when multiple users may utilize the same device, or when a user wishes to utilize different sets of corresponding attributes at different times or purposes. This identifier and corresponding attributes may be stored in end entity memory including a device memory, within a cookie in browser memory, and/or or otherwise accessible by the end entity 310 and application 320. This identifier is also stored in an ID database 334 in ASP 330 memory along with certain identifier attributes associated with that ID. ASP may contain many such IDs for multiple end entities. ID database 334 is accessible by software module 322 and service provider 340 given certain conditions as described below.

This identifier is unique, mutable, and is associated with certain attributes. These attributes may include information about the identifier itself such as expiration date of the identifier, last date the attributes were updated, general preferences of an end entity user such as privacy preferences, specific preferences of an end entity with regards to a specific application, links to other identifiers, or other attributes including any combination of the foregoing. This identifier may or may not be associated with one or more individuals, software applications, devices, or any combination thereof.

Application 320 may include a software module 322 for interacting with ASP 330. Software module 322 can obtain ID 314 from end entity 310, contact ASP 330 using ID 314 to obtain attributes from ID cache 334, and then may enforce the preferences within those attributes. For example, if service provider 340 requests certain information from application 320 not permitted by the attributes in ID database 334 (a copy of which may be stored in ID cache 324 or end entity 310), then software module 322 can prevent that information from being provided to service provider 340. Service provider 340 may also obtain identifier 314 through application 320, and then obtain attributes from software module 322, directly from ASP 330, or elsewhere such as end entity 310, for storage and use in ID cache 344. Service provider can then provide services for end entity 310 in accordance with those attributes. The actions of service provider software module 322 are explained in greater detail below with reference to FIG. 6.

Figure 4:
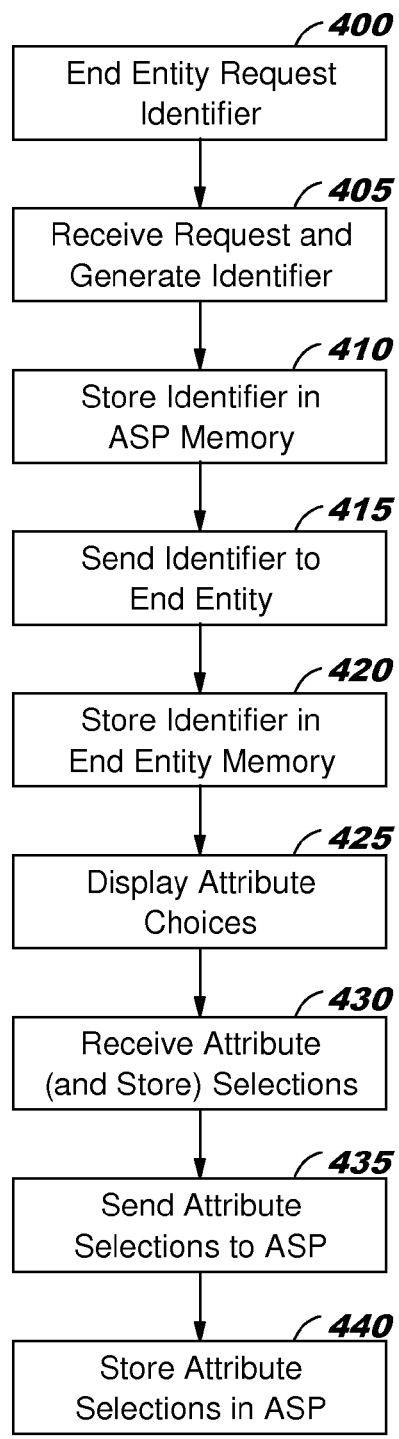
FIG. 4 is a flow diagram of creating an identifier and related attributes in which various embodiments may be implemented.

FIG. 4 is a flow diagram of creating an identifier and related attributes in which various embodiments may be implemented. In a first step 400, a request for an identifier is sent from the end entity to the attributes service provider (ASP). This may be in response to the installation or running of an application which may utilize preferences. Alternatively, the application may request the identifier on behalf of the end entity, particularly if the application needs certain preferences or other attributes from the end entity user. A login identifier may be provided by the end entity for use in future maintenance with the forthcoming unique ID. The login identifier may be as simple as an email address or it may be a public key or token digitally signed using a private key known to the end entity. Alternatively the login identifier may be provided by the ASP.

In step 405, the ASP receives the request and generates a unique identifier (ID) in response to the request. This identifier is unique to any other identifier within or accessible by the ASP. This unique identifier may be generated sequentially higher than a previously generated ID, generated by hashing a sequentially generated ID, generated randomly and then compared to all other IDs to verify uniqueness, or generated utilizing other types of known techniques. Once generated, the unique ID is then stored in ASP memory in an ID database in step 410. Subsequently the ID is then passed back to the end entity in step 415. The ASP may also pass certain general attribute selections back to the end entity. This can include general preferences such as whether a user of the end entity allows location tracking, directed advertising, etc.

The end entity then stores the identifier in memory in step 420. The end entity may store the identifier for global access by any application or for limited access by only the application which prompted the request for an identifier. The end entity may also store the identifier in a web-based cookie in a browser data storage location or HTML5 local storage for potential access by website(s) during web browsing as needed, often at user selection. This allows a bridging mechanism between the mobile operating system application space and the browser cache. Subsequently in step 425, the end entity then displays attribute choices for user selection. This can include general preferences requested by the ASP or preferences specific to the application that prompted the request for an identifier. These preferences can include privacy preference selections related to location tracking, information sharing (such as health or financial information), or other preference selections. Upon user selection, the attribute selections are received by the end entity in step 430. These attribute selections or applicable portions of those selections may be stored with the identifier in end entity memory and/or in a web-based cookie. As with the identifier, these attributes may be stored for global access or for limited access. The attributes may also be stored only temporarily to avoid possibly synchronization issues with the same attributes stored in the ASP. These attribute selections are then passed back to the ASP in step 435. The ASP then associates and stores the attribute selections with the identifier in ASP memory in step 440.

FIG. 5 is a block diagram of an identifier and its related attributes 500 in which various embodiments may be implemented. As described above, an attribute service provider may manage many identifiers and their related attributes. Identifier (ID) section 510 includes a copy of the unique ID 512 which may be in one a variety of forms. ID 510 may be of a specific form so that it may be clearly identified as an identifier for a set of attributes such as preferences and privacy preferences.

Attributes 520 includes several sections such as identifier attributes 530, linkages 540, general attributes 550, and application specific attributes 560. Identifier attributes include attributes regarding the identifier such as when it was created 532, expiration date 534, size of this record of attributes 536, etc. These attributes may be used to assist in managing the identifier and related attributes. For example, when an identifier expires, it may be renewed or a new identifier created which links to the expired identifier, thereby preserving related attributes. Linkages 540 can include linkages to prior expired identifiers and their attributes 542, to other identifiers that may be utilized by the same user across multiple end entities 544, etc. The end entity login identifier may also be stored with the identifier attributes or it may be separately stored in a more secure location with the unique identifier as an index. The end entity login identifier is not shared with other end entities or applications by the ASP.

General attributes 550 can include general selections by an end entity (i.e. by a user of that end entity) that may be used across multiple applications unless overridden by attributes specific to an application. This set of general attributes may be generated by the attribute service provider or may be a standard set of attributes generally accepted by many applications. For example, a user may have selected no to location tracking 552, thereby instructing all applications to not track the location of any end entity providing the related identifier. This selection can includes a selection whether that general preference may be overridden by a specific attribute for a particular application as described below in specific attributes 560. Another example may be a general selection of no direct advertising 554. Again, this may be overridden by application specific attributes 560 for a particular application if allowed.

Application specific attributes 560 includes sets of attributes for specific applications or application families (e.g. multiple versions of the same application running on different end entities). These application specific attributes are selected by an end entity for an application and may override any general preferences if allowed by the general preferences. For example, a first set of application specific attributes 561 includes an identification of the application(s) 562, creation date of the attributes 564, last update to the attributes 566, and preferences 568. These preferences can include privacy preferences related to advertising, tracking, sharing of user information, etc. Such preferences can be stored on a mobile device in memory or in an ASP database indexed by identifier such as described below.

Figure 6:
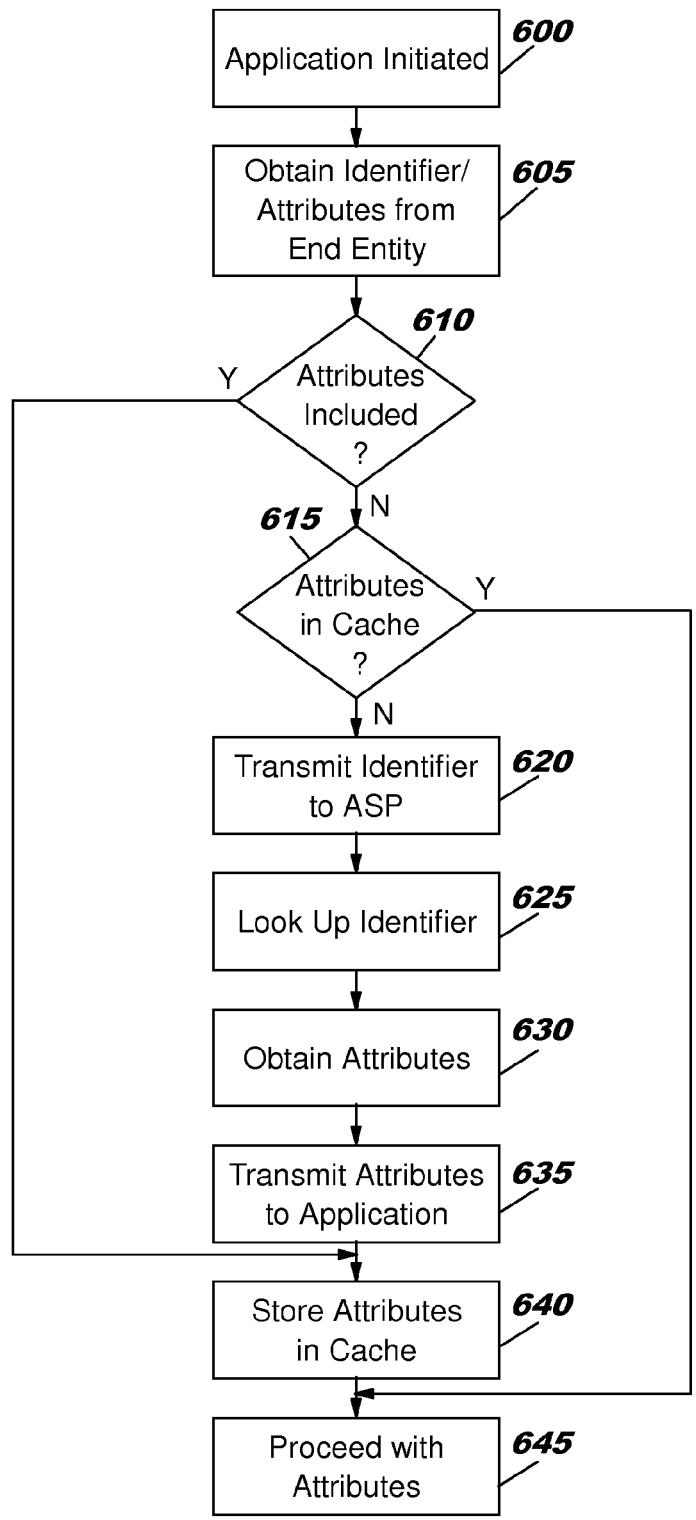
FIG. 6 is a flow diagram of an application obtaining attributes related to an end entity identifier in which various embodiments may be implemented.

FIG. 6 is a flow diagram of an application obtaining attributes related to an end entity identifier in which various embodiments may be implemented. In a first step 600, the end entity initiates an application. In the case of an application stored internally, this may be performed by a simple call. In the case of an internet browser, this may be performed by using a browser to open a URL (uniform resource locator) of a website. Then in step 605, the application obtains the end entity identifier and any associated attributes that may be stored in the end entity for determining any preferences or other attributes for that end entity. This can involve sending an inquiry to the end entity memory or to the browser memory. Once the identifier is obtained, the application determines in step 610 whether the associated attributes were included with the identifier. If yes, then processing continues to step 640 below, otherwise, processing continues to step 615. In step 615, the application determines whether it already has the attributes in an identifier cache. If yes, the processing continues to step 645 below, otherwise processing continues to step 620. In step 620, the application can pass the identifier to the attribute service provider (ASP) with a request for the associated attributes.

Figure 7:
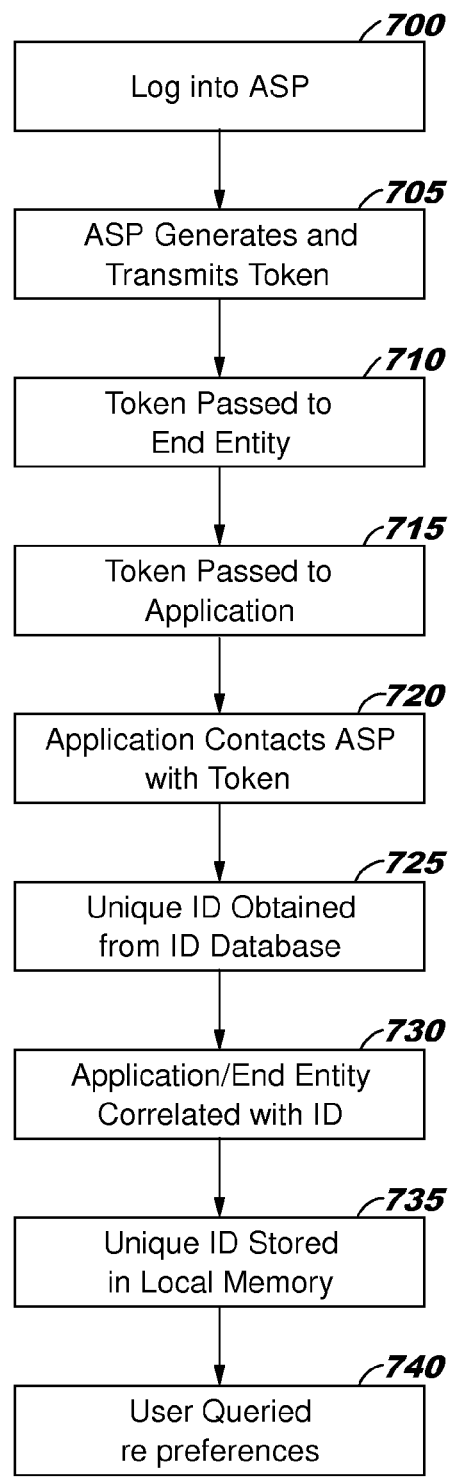
FIG. 7 is a flow diagram of correlating a second end entity to a single identifier in which various embodiments may be implemented.

The ASP then takes the identifier and looks up that identifier in ASP memory in step 625. The ASP then obtains the associated attributes also in memory in step 630. The associated attributes are then sent to the requesting application in step 635. If the application also provided identifying information about the application, then the ASP may only send the general attributes and the specific attributes for that application. In step 640, the application then stores the attributes in any application identifier cache is one is available. Subsequently, in step 645, the application proceeds according to the attributes for that end entity. That is, the application enforces the attributes FIG. 7 is a flow diagram of a second end entity obtaining correlation to an identifier in which various embodiments may be implemented. This process may be performed after a first end entity creates a unique identifier as described above with reference to FIG. 4. This process may be performed by the end entity that initially created the identifier or with a second end entity with the appropriate authority. This process may be performed by one or more end entities that have preregistered with the attribute service provider.

In a first step 700 an end entity logs into the attribute service provider with a login identifier and unique ID, the login identifier being previously associated with the unique ID in FIG. 4. The end entity logging in may be the first end entity that generated the login identifier and obtained the unique ID, or it may be a second end entity that received the unique ID and corresponding login identifier from the first end entity. In a second step 705, the attribute service provider generates a binding token. This is a token that may be signed by a private key of the ASP or other type of token. The token is time stamped and has a limited lifetime to avoid the misuse of that token. The lifetime is predesignated and may be set by the logged in end entity or preset by the ASP. The ASP then correlates the token with the unique ID and transmits the token to the logged in end entity in step 710.

Figure 8:
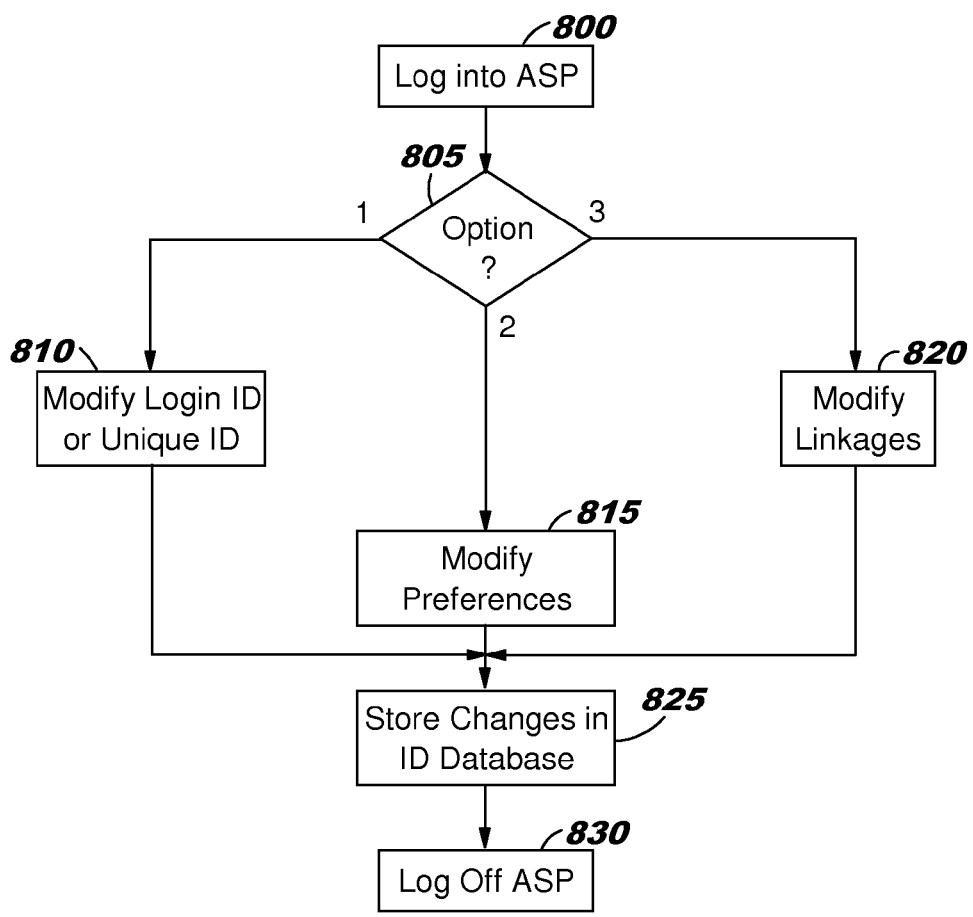
FIG. 8 is a flow diagram of an end entity managing the unique ID with the application service provider.

Subsequently in step 715, the end entity that logged in passes the token to the second end entity unless the second end entity is the entity that logged in, which then passes the token to a web browser, web page, or other application. Then in step 720, the application contacts the ASP with the binding token. Then in step 725, the ASP then obtains the corresponding unique ID from the ID database. If the token is within a predesignated time period, the ASP then recognizes the application and its end entity as correlated to the token in step 730. Alternatively, a derivative unique ID may be stored in memory for the application and its end entity. The application then stores that unique ID in local memory (end entity memory, web browser cache, application cache, etc.) in step 735. Subsequently in step 740, the user may be queried to establish preferences for that application which can be stored with the unique ID in the ASP as well as with the unique ID in local memory FIG. 8 is a flow diagram of an end entity managing the unique ID with the application service provider. In a first step 800, the end entity or application logs into the ASP using the login identifier with the unique ID. The end entity or application has several options at this point in step 805. The end entity may modify the unique identifier or login identifier 810, modify the preferences shown in the attributes 815, manage linkages with other identifiers also using the same login ID 820, etc. Once completed, then in step 825 the changes are reflected in the ASP ID database and in the end entity local memory, before logging off in step 830.

As a result of the mutability of the unique ID, third parties cannot reliably correlate a unique ID to a specific end entity or user, yet due to the flexibility of the unique identifier, the preferences and attributes can be stored and utilized for the protection and utilization of one or more users, end entities and applications.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for generating and/or utilizing identifiers used in identifying and implementing an end user's preferences or utilizing other user information. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of managing user preferences comprising:
    utilizing a processor to generate a unique mutable identifier in response to a request from an end entity;
    obtaining a set of user preferences from the end entity;
    associating and storing in memory the set of user preferences with the unique mutable identifier;
    providing the unique mutable identifier to the end entity; and
    providing the set of user preferences associated with the mutable identifier to any application for enforcement by that application in response to an inquiry utilizing the unique mutable identifier from that application;
    wherein a unique login identifier corresponds to the unique mutable identifier; and
    wherein the unique mutable identifier may be modified in response to a request received with the unique login identifier, the modified unique mutable identifier being associated with the set of user preferences.

2. The method of claim 1 wherein the set of user preferences are a set of user privacy preferences.

3. The method of claim 1 wherein the set of user preferences are a set of user security preferences.

4. The method of claim 1 further comprising obtaining credentials of the set of user preferences associated with the unique mutable identifier;

wherein the credentials are provided with the set of user preferences to any application in response to an inquiry utilizing the unique mutable identifier from that application.

5. The method of claim 1 wherein multiple unique mutable identifiers may be associated with the set of user preferences.

6. The method of claim 5 wherein a first unique login identifier may correspond to a first unique mutable identifier which is associated with a first set of user preferences, a second unique login identifier may correspond to a second unique mutable identifier also associated with the first set of user preferences.

7. The method of claim 1 wherein the set of user preferences may be modified in response to a request received with the unique login identifier, the modified set of user preferences being associated with the unique mutable identifier and stored in memory.

8. The method of claim 7 wherein the modified set of user preferences associated with the unique mutable identifier is provided to any application for enforcement by that application in response to an inquiry utilizing the unique mutable identifier from that application.

9. The method of claim 8 wherein the unique mutable identifier may be modified in response to a request received with the unique login identifier, the modified unique mutable identifier being associated with the set of user preferences;
wherein a first unique login identifier may correspond to a first unique mutable identifier which is associated with a first set of user preferences, a second unique login identifier may correspond to a second unique mutable identifier also associated with the first set of user preferences; and wherein the set of user preferences is selected from a group consisting of a set of user privacy preferences and a set of user security preferences.

10. A computer usable program product comprising a computer usable storage medium including computer usable code for use in managing user preferences, the computer usable program product comprising code for performing the steps of:
utilizing a processor to generate a unique mutable identifier in response to a request from an end entity;
obtaining a set of user preferences from the end entity;
associating and storing in memory the set of user preferences with the unique mutable identifier;
providing the unique mutable identifier to the end entity; and
providing the set of user preferences associated with the mutable identifier to any application for enforcement by that application in response to an inquiry utilizing the unique mutable identifier from that application;
wherein a unique login identifier corresponds to the unique mutable identifier; and
wherein the unique mutable identifier may be modified in response to a request received with the unique login identifier, the modified unique mutable identifier being associated with the set of user preferences.

11. The computer usable program product of claim 10 wherein the set of user preferences are a set of user privacy preferences.

12. The computer usable program product of claim 10 wherein the set of user preferences are a set of user security preferences.

13. The computer usable program product of claim 10 further comprising obtaining credentials of the set of user preferences associated with the unique mutable identifier;
wherein the credentials are provided with the set of user preferences to any application in response to an inquiry utilizing the unique mutable identifier from that application.

14. The computer usable program product of claim 10 wherein multiple unique mutable identifiers may be associated with the set of user preferences.

15. The computer usable program product of claim 14 wherein a first unique login identifier may correspond to a first unique mutable identifier which is associated with a first set of user preferences, a second unique login identifier may correspond to a second unique mutable identifier also associated with the first set of user preferences.

16. The computer usable program product of claim 10 wherein the set of user preferences may be modified in response to a request received with the unique login identifier, the modified set of user preferences being associated with the unique mutable identifier and stored in memory.

17. The computer usable program product of claim 16 wherein the modified set of user preferences associated with the unique mutable identifier is provided to any application for enforcement by that application in response to an inquiry utilizing the unique mutable identifier from that application.

18. A data processing system for managing user preferences, the data processing system comprising:
a processor; and
a memory storing program instructions which when executed by the processor execute the steps of:
utilizing the processor to generate a unique mutable identifier in response to a request from an end entity;
obtaining a set of user preferences from the end entity;
associating and storing in the memory the set of user preferences with the unique mutable identifier;
providing the unique mutable identifier to the end entity; and
providing the set of user preferences associated with the mutable identifier to any application for enforcement by that application in response to an inquiry utilizing the unique mutable identifier from that application;
wherein a unique login identifier corresponds to the unique mutable identifier; and
wherein the unique mutable identifier may be modified in response to a request received with the unique login identifier, the modified unique mutable identifier being associated with the set of user preferences.

19. The data processing system of claim 18 wherein the set of user preferences are a set of user privacy preferences.

20. The data processing system of claim 18 wherein the set of user preferences are a set of user security preferences.

21. The data processing system of claim 18 further comprising obtaining credentials of the set of user preferences associated with the unique mutable identifier;
Wherein the credentials are provided with the set of user preferences to any application in response to an inquiry utilizing the unique mutable identifier from that application.

22. The data processing system of claim 18 wherein multiple unique mutable identifiers may be associated with the set of user preferences.

23. The data processing system of claim 22 wherein a first unique login identifier may correspond to a first unique mutable identifier which is associated with a first set of user preferences, a second unique login identifier may correspond to a second unique mutable identifier also associated with the first set of user preferences.

24. The data processing system of claim 18 wherein the set of user preferences may be modified in response to a request received with the unique login identifier, the modified set of user preferences being associated with the unique mutable identifier and stored in memory.

25. The data processing system of claim 24 wherein the modified set of user preferences associated with the unique mutable identifier is provided to any application for enforcement by that application in response to an inquiry utilizing the unique mutable identifier from that application.

* * * * *